United States Patent [19]

Furukawa

[11] Patent Number: 5,594,484
[45] Date of Patent: Jan. 14, 1997

[54] METHOD OF RECORDING IMAGES

[76] Inventor: Kenichi Furukawa, 6-7-2 Ohjidai, Sakura-shi, Chiba-ken, 285, Japan

[21] Appl. No.: 406,610

[22] Filed: Mar. 20, 1995

[51] Int. Cl.$^6$ .................................................. B41J 2/005
[52] U.S. Cl. ........................... 347/95; 347/101; 347/106; 347/221
[58] Field of Search ........................... 347/95, 101, 106, 347/212, 213, 221; 503/227

[56] References Cited

U.S. PATENT DOCUMENTS

| | | | |
|---|---|---|---|
| 4,943,816 | 7/1990 | Sporer | 347/107 |
| 5,132,706 | 7/1992 | Yussa et al. | 346/140.1 |
| 5,175,568 | 12/1992 | Oyamaguchi | 346/140.1 |

*Primary Examiner*—Valerie A. Lund
*Attorney, Agent, or Firm*—Joseph C. Mason, Jr.; Murray B. Baxter; Mason & Associates, P.A.

[57] ABSTRACT

An image recording method is disclosed, which uses a substrate such as paper, a synthetic film, a metal plate, and an earthenware plate and an adhesive layer of a delayed-tack adhesive and activates the adhesive layer in accordance with image information, for example, by a step of endowing a tackiness to the adhesive layer by ejecting an organic solvent which renders the adhesive tacky from an ink jet printer cooperated with a computer in accordance with image information or a step of selectively heating the adhesive layer by a thermal printer to endow the adhesive layer with tackiness, and develops the latent image borne in the activated portion with powder selected from organic pigment powder, inorganic pigment powder, water-soluble dye powder, water-insoluble dye powder, metal powder, ceramics powder, plastics powder, magnetic powder, and microcapsules.

The method of this invention enables image recording without plate making using an ink jet printer or thermal printer cooperated with a computer and with any powder as a developer. The method is particularly useful as a method for producing articles with high definition image, as in painting of potteries or for other purposes, as a single product or small lot products.

9 Claims, No Drawings

METHOD OF RECORDING IMAGES

BACKGROUND OF THE INVENTION

1. Field of the Invention

This invention relates to a method of recording images in which any powder inclusive of those that have not been formulated into an ink or a toner can be used as a developer. More particularly, this invention relates to a method of recording images which comprises the steps of imagewise activating an adhesive layer that is activated by heat or with a solvent, and allowing powder to attach to the imagewise activated adhesive layer to develop it.

The use of the method of recording images according to this invention enables painting on potteries and the like image formation efficiently and at low cost.

2. Description of Related Art

Development with powder which is imagewise and selectively attached to an object has been used in various fields including, for example, formation of transfer sheet for use in painting potteries. A varnish is offset-printed on a transfer sheet made of a base paper coated with a water-soluble adhesive such as dextrin, and ceramic pigment powder is sprayed onto the printed surface of the base paper before the varnish is cured due to its oxidative polymerization. As a result, the powder is adhered to the base paper. Then, an acrylic resin is sprayed onto the surface of the transfer sheet. After being dried, the transfer sheet is dipped into water to lift the image layer from the base paper, which layer is received on a surface of a pottery so that the image is fixed (underwater transfer method). After the fixing, the image layer is dried and baked to complete painting on the pottery.

For ad purposes, so-called "chromalin" technology by Du Pont is known. According to it, a positive film superposed on a substrate provided with a film which becomes adhesive upon exposure to UV radiation is contact-exposed to become selectively or imagewise adhesive, and powder is attached to the adhesive portion to develop the image. The above-described process is repeated four times in order to develop four positive films for four separated colors so that a full color high definition expression can be realized.

The above-described methods need plate making so that they are unsuited for single part production or small lot production.

SUMMARY OF THE INVENTION

The present inventor has made a research on a method for the recording of an image with powder on a single article or a small number lot thereof such as imagewise painting on the pottery and investigated if a delayed-tack type adhesive can be used in such a method.

Delayed-tack type adhesives do not show adhesion properties at ambient temperature (e.g., 15°–25° C.). However, they will be activated when contacting specified organic solvents or when heated to temperatures above a predetermined temperature and remain to be adhesive for a period of from several minutes to several hours. Utilizing these properties, the present inventors now have confirmed that images can be recorded or formed on a recording medium comprising a substrate coated with a delayed-tack type adhesive by selectively ejecting an organic solvent from nozzles of an ink jet printer or selectively heating by a heater of a thermal printer, both cooperated with a computer, to partially or imagewise render the recording medium tacky and applying powder to the tacky portion for development. The present invention has been completed based on this discovery.

According to a first aspect of the present invention, there is provided a method of recording image, comprising the steps of:

(a) providing a recording medium comprising a substrate and an adhesive layer made of a delayed-tack adhesive provided evenly or smoothly on a surface of the substrate;

(b) rendering the adhesive layer tacky in accordance with image information to form an imagewise tacky portion; and (c) applying powder to the imagewise tacky portion.

The step (b) may be performed by applying an organic solvent in accordance with the image information to render a portion which has absorbed the solvent.

The organic solvent may be ejected selectively in accordance with the image information from an ink jet printer cooperated with a computer.

The step (b) may be performed by selectively heating the adhesive layer of the recording medium in accordance with the image information to render the heated portion tacky.

The heating may be performed using a thermal printer cooperated with a computer.

The delayed-tack adhesive may comprise at least one thermoplastic resin selected from the group consisting of ethylene/vinyl acetate copolymers, ionomers, polyamides, polyesters, polyacrylates and polyurethanes.

The thermoplastic resin may be blended with at least one member selected from the group consisting of hydrocarbons, rosins, ester rosins, xylene resins, terpene resins, phenol resins, and terpene/phenol resins.

The delayed-tack adhesive may comprise a blend of a styrene/butadiene block copolymer and at least one resin selected from the group consisting of coumarone resins, styrene resins, xylene resins, and phenol-modified resins.

The substrate may be one selected from the group consisting of paper, a synthetic film, a metal plate, and an earthenware plate.

The ink jet printer which can be used in this invention for imagewise activating the delayed-tack adhesive layer may be of any type as far as it is comprised by a material or materials that is resistant to the organic solvents used. For example, piezo-electric type ink jet printers, which can be operated at high ejection frequencies, bubble type ink jet printers, which are easy to be equipped with multinozzles, generally employed in the art may be selected freely. In the case of printers with ink jet heads whose head packages are comprised by general purpose resins such as polystyrene (PS), acrylonitrile/styrene copolymer (AS) and acrylonitrile/butadiene/styrene copolymer (ABS), there can be used aliphatic hydrocarbon or alcoholic solvents that do not attack such resins in combination with adhesives that can be activated with such solvents.

The organic solvents which can be used in ink jet printers are not limited particularly so far as they can activate adhesives used but may be selected from various solvents, for example, ketone solvents such as acetone, methyl ethyl ketone, and cyclohexanone; aromatic hydrocarbon solvents such as benzene, toluene, and xylene; acetates such as methyl acetate and ethyl acetate; generally used organic solvents such as diethyl ether and trichloroethylene; aliphatic hydrocarbon solvents such as n-hexane, n-heptane, and isooctane; alcohols such as methanol, ethanol, isopropyl alcohol, and amyl alcohol; and the like.

The thermal printers which can be used advantageously in this invention include those whose heat generation temperature and time can be freely set or adjusted by controlling applied voltage or pulse interval for heat generation.

The delayed-tack adhesives which can be used in this invention include (1) thermoplastic resins such as ethylene/vinyl acetate copolymers, ionomers, polyamides, polyesters, polyacrylates, and polyurethanes, optionally blended with one or more of other resins such as, for example, hydrocarbon resins, rosins, ester rosins, xylene resins, terpene resins, phenol resins, and terpene/phenol resins and (2) styrene/butadiene block copolymers blended with one or more of other resins such as, for example, coumarone resins, styrene resins, xylene resins, and phenol-modified resins. It is preferred that these resins be adjusted so that they will not be tacky at ambient temperature (e.g., 15°–25° C.) but have softening points not lower than 80° C.

In the case where the resins (1) above are used as the delayed-tack adhesive, it is preferred that the other resins be blended in proportions of not more than 100 parts by weight per 100 parts by weight of the thermoplastic resins. On the other hand, the other resins in (2) above are blended with the styrene/butadiene block copolymers preferably in proportions of 10 to 60 parts by weight per 100 parts by weight of the block copolymers. When blended with the other resins in proportions outside the above-mentioned ranges, the resulting resins tend to become tacky at ambient temperature, which is undesirable. In order to improve non-tackiness of the delayed-tack resins at ambient temperature, anti-blocking agents such as waxes and fatty acid amides may be added to the resins in amounts not larger than 10 parts by weight per 100 parts by weight of the thermoplastic resins or the block copolymers.

The delayed-tack adhesives may be provided in the form of a thin layer smoothly or evenly coated on a flat substrate such as paper, synthetic resin films, metal plates, and porcelain plates. Releasing agents, for example, metal soaps such as calcium stearate, petroleum wax, esters, fatty acid amides, and polyethylene glycol may be overcoated, if desired or necessary, in order to facilitate removal of excess powder in a non-image or non-activated portion or area. Conventional anti-static treatment may be carried out, if desired or necessary, in order to prevent adherence of powder due to static charge. The thickness of the adhesive layer may vary depending on the nature and sensitivity to solvent or heat of the adhesive but usually ranges from about 5 μm to about 50 μm, and more preferably from 10 μm to 30 μm.

In this invention, the activated portion of the adhesive is developed with powder.

Here, the powder which can be used in the development of the activated adhesive include any powder including organic pigments, inorganic pigments, water-soluble and water-insoluble dyes, metal powder, ceramic powder, plastic powder, magnetic powder, microcapsules, and the like.

In this invention, the development, or selective attachment of the powder to the activated portion of the adhesive layer, may be carried out by a conventional method. More specifically, the above-described powder may be applied by brushing onto the surface of the adhesive layer and unnecessary powder may be removed by rolling wet toilet paper or the like over the surface of the thus-treated adhesive layer in order to allow the powder to adhere to the activated portion of the adhesive selectively or imagewise. On an industrial basis, it is convenient to employ a cascade method commonly used in the development of static latent images with powder, in which method powder is sprayed with air in a closed chamber and excess or unnecessary powder is removed by absorbing air entraining the powder.

Also, it is possible to use a one-pass type multicolor printing apparatus that does not involve plate making and comprises a plurality of units each performing therein the steps of selectively giving tackiness to a substrate, developing with powder, and removing unnecessary powder so that development with different color powder can be carried out in a different unit.

As stated above, the image recording method of this invention makes the most of the process based on a simple phenomenon that powder is adhered onto an adhesive layer coated on a substrate, and, hence, various types of powders including organic pigments, inorganic pigments, water-soluble dyes, water-insoluble dyes, metal powder, ceramic powder, plastics powder, magnetic powder, and microcapsules, can be used as a developer in a substantial manner, regardless of whether or not they can be formulated into ink or toner, or without need to formulate them into ink or toner at high cost, if they can be formulated into ink or toner. This is a major feature of this invention. In addition, according to the method of this invention, it is sufficient to prepare only necessary amounts of desired special color powders by mixing basic color powders at the time when recording is performed. Therefore, the method of this invention shows a great adaptability and allows one to meet orders for small lot custom-made products at low cost.

ADVANTAGES OF THE INVENTION

With the method of recording images according to this invention, image recording can be achieved using an ink jet printer or thermal printer cooperated with a computer, and with any powder as a developer, without plate making.

The images formed according to the image recording method of this invention can be used for various purposes as described below.

The images formed by the method of this invention may be used as they are or after they are provided with an overcoat by spraying a resin thereon or after they are laminated with a film. Alternatively, a reversed image may be recorded on a transparent adhesive layer formed on a transparent film, which is then combined or laminated on a desired material upside down, so that a highly durable image can be formed on any desired substrate including plates, articles, etc. made of metals and wood. This is convenient since it is only necessary to have the image contacted a material or object and heat the thus-combined material, without separately applying a laminating adhesive, in order for the adhesive layer coated in advance to become activated with heat and bonded to the material or object over its whole surface.

Further, the method of this invention can be applied to painting of pottery tile using a transfer paper for painting that comprises a releasable substrate on which image is recorded. The releasable substrate which can be used in this invention is a base paper provided with a releasing agent in amounts of 0.01 to 0.1 g/m$^2$. The substrate is provided with an adhesive layer as by coating a delayed-tack adhesive. In use, ceramic pigment powder is recorded on the thus-obtained transfer paper. Thereafter, the recorded transfer paper is contacted with a pottery and heated together, followed by baking after releasing the substrate. Examples of the releasable substrate include craft paper anchor-coated with polyethylene, polyvinyl alcohol (PVA), or carboxylmethylcellulose (CMC), glassine paper, which is smooth and less permeable, and parchment paper. As the releasing agent, there can be cited, for example, (1) releasing agents having low surface energy which contain copolymers of a monomer having a long alkyl group, e.g., an octadecyl group, selected from acrylic esters, vinyl esters, vinyl ethers, acrylamides, maleic acid derivatives, and the like with other monomer or monomers; (2) releasing agents obtained by reacting a compound having a long chain alkyl group such as octadecyl chloride with a polymer such as PVA or cellulose; (3) releasing agents containing silicone compounds or fluorine-containing compounds.

When this invention is applied to general potteries, there can be used a substrate having provided thereon a layer of a water-soluble adhesive such as dextrin and a layer of the above-mentioned adhesive in order in combination with an under-water transfer method. That is, image is recorded on the adhesive layer and an acrylic resin is sprayed on the imaged substrate. After being dried, the substrate is dipped in water and the image layer is lifted in water and received on a surface of a pottery.

DESCRIPTION OF PREFERRED EMBODIMENTS

Hereinafter, the present invention will be described in greater detail by embodiments with reference to the attached drawings. However, the present invention should not be construed as being limited thereto.

EXAMPLE 1

A recording paper was prepared by coating a delayed-tack adhesive, Heatmagic DW-1000 (trademark, produced by Toyo Ink Manufacturing Co., Ltd.), on art paper in an amount of 30 g/m$^2$. Methyl ethyl ketone was ejected for printing on the art paper from an ink jet printer, Macrojet 2 (trademark, produced by Domino Co., Ltd.), to render the printed portion tacky. Thereafter, ceramic pigment powder (produced by Degussa Co., Ltd., average particle diameter of 5 μm) was coated by brushing on the adhesive layer, followed by rolling wet toilet paper thereover to remove unnecessary powder. The printed surface of the recording paper was contacted a surface of a white tile and the thus-combined tile was heated at 150° C. for 20 seconds under a pressure of 2 kg/cm$^2$. Immediately thereafter, the base paper was separated. The tile was baked at 850° C. for 2 hours to obtain a tile with a clearly painted image.

EXAMPLE 2

The same recording paper as described in Example 1 was directly printed (heated) by the built-in thermal printer in a word processor, WD-A600 (trademark, produced by Sharp Co., Ltd.) to render the printed portion tacky. Thereafter, the same ceramic pigment powder as used in Example 1 was coated by brushing on the printed surface of the recording paper, followed by rolling a toilet paper over the surface to remove unnecessary powder. The printed surface of the recording paper was contacted on a surface of a white tile and the thus-combined tile was heated at 150° C. for 20 seconds under a pressure of 2 kg/cm$^2$. Immediately thereafter, the base paper was separated. The tile was baked at 850° C. for 2 hours to obtain a tile with a clearly painted image.

EXAMPLE 3

A recording paper was prepared by coating a urethane/acrylic alcohol-activatable adhesive, S-170 (trademark, produced by Cosmotech Co., Ltd.) on a dextrin-coated transfer paper for potteries, SPC-II (trademark, produced by Marushige Paper Works Co., Ltd.), in an amount of 30 g/m$^2$. Isopropyl alcohol was ejected for printing on the recording paper from an ink jet printer, Art Writer AW-100 (trademark, produced by Seiko Epson Co., Ltd.), to render the printed portion tacky. Thereafter, the same ceramic pigment powder as used in Example 1 was coated by brushing on the adhesive layer, followed by rolling wet toilet paper thereover to remove unnecessary powder. The printed surface of the recording paper was contacted a surface of a white tile and the thus-combined tile was wetted with water to separate the base paper. After being dried, the imaged-transferred tile was sprayed with a resin and dried. The thus-treated tile was baked at 850° C. for 2 hours to obtain a tile with a clearly painted image.

What is claimed is:

1. A method of recording image, comprising the steps of:
   (a) providing a recording medium comprising a substrate and an adhesive layer made of a delayed-tack adhesive provided evenly or smoothly on a surface of the substrate;
   (b) rendering the adhesive layer tacky in accordance with image information to form an imagewise tacky portion; and
   (c) applying powder to the imagewise tacky portion.

2. The method as claimed in claim 1, wherein said step (b) is performed by applying an organic solvent in accordance with said image information to render a portion which has absorbed said solvent.

3. The method as claimed in claim 2, wherein said organic solvent is ejected selectively in accordance with said image information from an ink jet printer cooperated with a computer.

4. The method as claimed in claim 1, wherein said step (b) is performed by selectively heating said adhesive layer of said recording medium in accordance with said image information to render the heated portion tacky.

5. The method as claimed in claim 4, wherein said heating is performed using a thermal printer cooperated with a computer.

6. The method as claimed in claim 1, wherein said delayed-tack adhesive comprises at least one thermoplastic resin selected from the group consisting of ethylene/vinyl acetate copolymers, ionomers, polyamides, polyesters, polyacrylates and polyurethanes.

7. The method as claimed in claim 6, wherein said at least one thermoplastic resin is blended with at least one member selected from the group consisting of hydrocarbons, rosins, ester rosins, xylene resins, terpene resins, phenol resins, and terpene/phenol resins.

8. The method as claimed in claim 1, wherein said delayed-tack adhesive comprises a blend of a styrene/butadiene block copolymer and at least one resin selected from the group consisting of coumarone resins, styrene resins, xylene resins, and phenol-modified resins.

9. The method as claimed in claim 1, wherein said substrate is one selected from the group consisting of paper, a synthetic film, a metal plate, and an earthenware plate.

* * * * *